United States Patent
Lee et al.

(10) Patent No.: US 11,339,257 B2
(45) Date of Patent: May 24, 2022

(54) METHOD OF PREPARING CHEMICALLY MODIFIED ANION EXCHANGE MEMBRANE

(71) Applicant: DANKOOK UNIVERSITY CHEONAN CAMPUS INDUSTRY ACADEMIC COOPERATION FOUNDATION, Cheonan-si (KR)

(72) Inventors: Chang Hyun Lee, Seongnam-si (KR); Jin Pyo Hwang, Cheonan-si (KR)

(73) Assignee: DANKOOK UNIVERSITY CHEONAN CAMPUS INDUSTRY ACADEMIC COOPERATION FOUNDATION

(*) Notice: Subject to any disclaimer, the term of this patent is extended or adjusted under 35 U.S.C. 154(b) by 313 days.

(21) Appl. No.: 16/606,222

(22) PCT Filed: Apr. 19, 2018

(86) PCT No.: PCT/KR2018/004559
§ 371 (c)(1),
(2) Date: Oct. 17, 2019

(87) PCT Pub. No.: WO2018/194395
PCT Pub. Date: Oct. 25, 2018

(65) Prior Publication Data
US 2020/0040151 A1    Feb. 6, 2020

(30) Foreign Application Priority Data

Apr. 21, 2017  (KR) .................. 10-2017-0051625
Apr. 12, 2018  (KR) .................. 10-2018-0042725

(51) Int. Cl.
*C08J 5/22*  (2006.01)
*B01J 41/13*  (2017.01)
(Continued)

(52) U.S. Cl.
CPC ............ *C08J 5/2293* (2013.01); *B01D 61/44* (2013.01); *B01D 69/10* (2013.01); *B01D 69/12* (2013.01);
(Continued)

(58) Field of Classification Search
CPC .... C08J 5/2293; C08J 5/2281; C08J 2327/18; B01J 41/13; B01J 41/14; B01J 39/20;
(Continued)

(56) References Cited

U.S. PATENT DOCUMENTS

2018/0326361 A1* 11/2018 Choi .................. B01D 67/0027

FOREIGN PATENT DOCUMENTS

EP          0166015 A1 *  1/1986  ............. B01J 41/14
KR      20130025582 A      3/2013
(Continued)

OTHER PUBLICATIONS

Jeong et al. "Synthesis of an aminated poly(vinylidene fluoride-g-4-vinyl benzyl chloride) anion exchange membrane for membrane capacitive deionization(MCDI)", Journal of Membrane Science (2015), vol. 495, pp. 316-321. (Year: 2015).*
(Continued)

*Primary Examiner* — Michael M. Bernshteyn
(74) *Attorney, Agent, or Firm* — Renaissance IP Law Group LLP

(57) ABSTRACT

The present inventive concept relates to a chemically modified anion exchange membrane and a method of preparing the same and, more particularly, an anion exchange membrane in which sulfonic acid groups in a perfluorinated sulfonic acid electrolyte membrane are substituted with anion conductive groups such as ammonium group, phosphonium group, imidazolium group, pyridinium group and sulfonium group, and a method of preparing an anion exchange membrane by chemically modifying sulfonic acid (Continued)

groups in a perfluorinated sulfonic acid electrolyte membrane.

11 Claims, 7 Drawing Sheets

(51) Int. Cl.
| | |
|---|---|
| *B01J 41/14* | (2006.01) |
| *B01D 61/44* | (2006.01) |
| *B01D 69/10* | (2006.01) |
| *B01D 69/12* | (2006.01) |
| *B01D 71/26* | (2006.01) |
| *B01D 71/36* | (2006.01) |
| *B01D 71/48* | (2006.01) |
| *B01D 71/56* | (2006.01) |
| *B01D 71/64* | (2006.01) |
| *B01D 71/66* | (2006.01) |
| *B01J 39/20* | (2006.01) |

(52) U.S. Cl.
CPC ............ *B01D 71/26* (2013.01); *B01D 71/36* (2013.01); *B01D 71/48* (2013.01); *B01D 71/56* (2013.01); *B01D 71/64* (2013.01); *B01D 71/66* (2013.01); *B01J 41/13* (2017.01); *B01J 41/14* (2013.01); *C08J 5/2281* (2013.01); *B01J 39/20* (2013.01); *C08J 2327/18* (2013.01)

(58) Field of Classification Search
CPC ........ B01D 61/44; B01D 69/10; B01D 69/12; B01D 71/26; B01D 71/36; B01D 71/48; B01D 71/56; B01D 71/64; B01D 71/66
USPC .......................................................... 521/27
See application file for complete search history.

(56) References Cited

FOREIGN PATENT DOCUMENTS

| KR | 1020110088980 A | * | 1/2014 | .......... H01M 8/1067 |
| KR | 20140119479 A | | 10/2014 | |
| KR | 1020130035183 A | * | 7/2015 | ................ C08J 5/22 |

OTHER PUBLICATIONS

Mallinson et al. "Examination of Amine-Functionalized Anion-Exchange Membranes for Possible Use in the All-Vanadium Redox Flow Battery", Electrochimica Acta (2014), vol. 140, 145-151. (Year: 2014).*

* cited by examiner

FIG. 3

| Classification | Density (g/cm³) | Thickness of membrane (μm) | Classification | Density (g/cm³) | Thickness of membrane (μm) |
|---|---|---|---|---|---|
| Example 1 | 1.92 | 176 | Example 39 | 2.13 | 53 |
| Example 2 | 1.95 | 177 | Example 40 | 2.20 | 15 |
| Example 3 | 1.91 | 176 | Example 41 | 2.00 | 56 |
| Example 4 | 1.93 | 177 | Example 42 | 1.99 | 55 |
| Example 5 | 1.94 | 175 | Example 43 | 2.00 | 26 |
| Example 6 | 1.93 | 176 | Example 44 | 1.99 | 51 |
| Example 7 | 1.91 | 175 | Example 45 | 2.11 | 53 |
| Example 8 | 1.98 | 174 | Example 46 | 2.05 | 52 |
| Example 9 | 1.96 | 175 | Example 47 | 2.21 | 13 |
| Example 10 | 1.97 | 174 | Example 48 | 2.01 | 53 |
| Example 11 | 1.93 | 177 | Example 49 | 2.08 | 50 |
| Example 12 | 1.95 | 177 | Example 50 | 2.02 | 25 |
| Example 13 | 1.94 | 176 | Example 51 | 1.97 | 50 |
| Example 14 | 2.06 | 13 | Example 52 | 2.09 | 52 |
| Example 15 | 2.10 | 15 | Example 53 | 2.00 | 51 |
| Example 16 | 2.08 | 14 | Example 54 | 2.19 | 15 |
| Example 17 | 2.07 | 16 | Example 55 | 1.99 | 52 |
| Example 18 | 2.06 | 12 | Example 56 | 2.03 | 51 |
| Example 19 | 1.94 | 176 | Example 57 | 2.01 | 27 |
| Example 20 | 1.95 | 174 | Example 58 | 1.98 | 53 |
| Example 21 | 1.91 | 179 | Example 59 | 2.07 | 50 |
| Example 22 | 1.94 | 175 | Example 60 | 2.02 | 53 |
| Example 23 | 1.97 | 176 | Example 61 | 2.16 | 13 |
| Example 24 | 1.98 | 175 | Example 62 | 2.01 | 54 |
| Example 25 | 1.97 | 175 | Example 63 | 2.01 | 55 |
| Example 26 | 1.98 | 174 | Example 64 | 2.09 | 25 |
| Example 27 | 1.96 | 176 | Example 65 | 1.99 | 54 |
| Example 28 | 1.96 | 177 | Example 66 | 2.05 | 52 |
| Example 29 | 1.94 | 176 | Example 67 | 2.06 | 51 |
| Example 30 | 1.95 | 178 | Example 68 | 2.20 | 14 |
| Example 31 | 1.98 | 175 | Example 69 | 2.02 | 52 |
| Example 32 | 1.94 | 177 | Example 70 | 2.04 | 53 |
| Example 33 | 1.98 | 177 | Comparative Example 1 | 0.94 | 201 |
| Example 34 | 1.95 | 176 | Comparative Example 2 | 0.91 | 184 |
| Example 35 | 1.97 | 179 | Comparative Example 3 | 0.85 | 159 |
| Example 36 | 1.98 | 26 | Comparative Example 4 | 0.8 | 156 |
| Example 37 | 2.01 | 54 | | | |
| Example 38 | 2.10 | 55 | | | |

FIG. 4

| Classification | 80 °C OH⁻ Ion Conductivity (S/cm) | Classification | 80 °C OH⁻ Ion Conductivity (S/cm) |
|---|---|---|---|
| Example 1 | 0.068 | Example 39 | 0.116 |
| Example 2 | 0.067 | Example 40 | 0.261 |
| Example 3 | 0.051 | Example 41 | 0.109 |
| Example 4 | 0.059 | Example 42 | 0.109 |
| Example 5 | 0.067 | Example 43 | 0.101 |
| Example 6 | 0.053 | Example 44 | 0.092 |
| Example 7 | 0.057 | Example 45 | 0.112 |
| Example 8 | 0.068 | Example 46 | 0.116 |
| Example 9 | 0.052 | Example 47 | 0.261 |
| Example 10 | 0.057 | Example 48 | 0.108 |
| Example 11 | 0.067 | Example 49 | 0.109 |
| Example 12 | 0.051 | Example 50 | 0.101 |
| Example 13 | 0.061 | Example 51 | 0.092 |
| Example 14 | 0.259 | Example 52 | 0.112 |
| Example 15 | 0.252 | Example 53 | 0.116 |
| Example 16 | 0.257 | Example 54 | 0.262 |
| Example 17 | 0.256 | Example 55 | 0.108 |
| Example 18 | 0.251 | Example 56 | 0.107 |
| Example 19 | 0.067 | Example 57 | 0.102 |
| Example 20 | 0.069 | Example 58 | 0.091 |
| Example 21 | 0.067 | Example 59 | 0.113 |
| Example 22 | 0.068 | Example 60 | 0.115 |
| Example 23 | 0.066 | Example 61 | 0.263 |
| Example 24 | 0.069 | Example 62 | 0.108 |
| Example 25 | 0.065 | Example 63 | 0.106 |
| Example 26 | 0.064 | Example 64 | 0.102 |
| Example 27 | 0.068 | Example 65 | 0.093 |
| Example 28 | 0.062 | Example 66 | 0.115 |
| Example 29 | 0.061 | Example 67 | 0.117 |
| Example 30 | 0.067 | Example 68 | 0.262 |
| Example 31 | 0.064 | Example 69 | 0.109 |
| Example 32 | 0.065 | Example 70 | 0.107 |
| Example 33 | 0.066 | Comparative Example 1 | 0.014 |
| Example 34 | 0.064 | Comparative Example 2 | 0.011 |
| Example 35 | 0.071 | Comparative Example 3 | 0.025 |
| Example 36 | 0.102 | Comparative Example 4 | 0.021 |
| Example 37 | 0.091 | | |
| Example 38 | 0.113 | | |

FIG. 7

| Classification | Surface Specific Resistance (Ω cm²) | Thickness of membrane (μm) | Classification | Surface Specific Resistance (Ω cm²) | Thickness of membrane (μm) |
|---|---|---|---|---|---|
| Example 1 | 0.321 | 176 | Example 39 | 0.196 | 53 |
| Example 2 | 0.333 | 177 | Example 40 | 0.028 | 15 |
| Example 3 | 0.358 | 176 | Example 41 | 0.285 | 56 |
| Example 4 | 0.361 | 177 | Example 42 | 0.274 | 55 |
| Example 5 | 0.331 | 175 | Example 43 | 0.263 | 26 |
| Example 6 | 0.354 | 176 | Example 44 | 0.221 | 51 |
| Example 7 | 0.362 | 175 | Example 45 | 0.199 | 53 |
| Example 8 | 0.329 | 174 | Example 46 | 0.199 | 52 |
| Example 9 | 0.351 | 175 | Example 47 | 0.031 | 13 |
| Example 10 | 0.361 | 174 | Example 48 | 0.298 | 53 |
| Example 11 | 0.324 | 177 | Example 49 | 0.262 | 50 |
| Example 12 | 0.352 | 177 | Example 50 | 0.268 | 25 |
| Example 13 | 0.363 | 176 | Example 51 | 0.227 | 50 |
| Example 14 | 0.034 | 13 | Example 52 | 0.205 | 52 |
| Example 15 | 0.038 | 15 | Example 53 | 0.206 | 51 |
| Example 16 | 0.037 | 14 | Example 54 | 0.032 | 15 |
| Example 17 | 0.036 | 16 | Example 55 | 0.302 | 52 |
| Example 18 | 0.035 | 12 | Example 56 | 0.292 | 51 |
| Example 19 | 0.323 | 176 | Example 57 | 0.269 | 27 |
| Example 20 | 0.365 | 174 | Example 58 | 0.228 | 53 |
| Example 21 | 0.361 | 179 | Example 59 | 0.206 | 50 |
| Example 22 | 0.354 | 175 | Example 60 | 0.207 | 53 |
| Example 23 | 0.311 | 176 | Example 61 | 0.033 | 13 |
| Example 24 | 0.312 | 175 | Example 62 | 0.301 | 54 |
| Example 25 | 0.313 | 175 | Example 63 | 0.293 | 55 |
| Example 26 | 0.315 | 174 | Example 64 | 0.264 | 25 |
| Example 27 | 0.321 | 176 | Example 65 | 0.227 | 54 |
| Example 28 | 0.311 | 177 | Example 66 | 0.202 | 52 |
| Example 29 | 0.312 | 176 | Example 67 | 0.203 | 51 |
| Example 30 | 0.313 | 178 | Example 68 | 0.033 | 14 |
| Example 31 | 0.321 | 175 | Example 69 | 0.299 | 52 |
| Example 32 | 0.311 | 177 | Example 70 | 0.269 | 53 |
| Example 33 | 0.311 | 177 | Comparative Example 1 | 20.512 | 201 |
| Example 34 | 0.315 | 178 | Comparative Example 2 | 18.246 | 164 |
| Example 35 | 0.331 | 179 | Comparative Example 3 | 5.418 | 159 |
| Example 36 | 0.251 | 28 | Comparative Example 4 | 4.537 | 156 |
| Example 37 | 0.213 | 54 | | | |
| Example 38 | 0.188 | 55 | | | |

METHOD OF PREPARING CHEMICALLY MODIFIED ANION EXCHANGE MEMBRANE

TECHNICAL FIELD

The present disclosure relates to chemically modified an anion exchange membrane and a method of preparing the same, and more particularly, to a method of preparing an anion exchange membrane by modifying sulfonic acid groups ($-SO_3^-H^+$) of a perfluorinated sulfonic acid electrolyte membrane with various anion conductive groups and an anion exchange membrane, which are chemically modified thereby.

BACKGROUND ART

An ion-exchange membrane refers to a polymer membrane that selectively permeates anions and cations and is classified into a cation exchange membrane and an anion exchange membrane according to its charge characteristics, respectively. A cation exchange membrane has negatively charged functional groups, permeates only cations by electrical attraction, and blocks the movement of anions by electrostatic repulsion. In addition, an anion exchange membrane has positively charged functional groups, transports anions by electrical attraction, and blocks the movement of cations by electrostatic repulsion.

Such ion-exchange membranes should have excellent selective permeability and ion exchange capacity, low electrical resistance and diffusion coefficient, excellent electrical properties, and low production costs. Particularly, ion-exchange membranes in the field of fuel cells or redox flow cells require larger ion exchange capacity and better electrical properties than conventional membranes.

However, when DuPont Nafion117, which is a commercially available anion exchange membrane, is used, since the crossover of ions in a battery occurs severely, self-discharge of the battery occurs and thus the battery has low efficiency. In addition, the ion-exchange membranes used as a separator in the water treatment field have to have excellent resistance to strong acid and base substances, and AMX known as a representative anion exchange membrane has excellent ion exchange capacity and electrical property, but poor chemical resistance, thereby easily reducing durability and efficiency.

Meanwhile, in Korean Unexamined Patent Application No. 10-2013-00255821, an ion-exchange membrane prepared by synthesizing 4-vinylbenzyl chloride, styrene and 2-hydroxyethyl acrylate, amination and crosslinking, and a method of preparing the same are disclosed, and in Korean Unexamined Patent Application No. 10-2014-0119479, a method of preparing an anion exchange membrane by converting a copolymer containing a vinyl imidazole-based compound, trifluoroalkyl(meth)acrylate, and a divinylbenzene-based monomer into a quaternary ammonium compound and performing thermal treatment is disclosed. However, since such a preparation method has complicated steps, production efficiency is lowered, and since the thickness of the membrane increases to reinforce the mechanical property or chemical resistance of the ion-exchange membrane, ion exchange performance is lowered.

For this reason, the development of anion exchange membranes is required to solve the difficulty in membrane formation due to low solubility, which is the unique characteristic of an anion conductive ionomer, a high resistance due to a large thickness, and low performance of an anion exchange membrane having a hydrocarbon-based main chain.

DISCLOSURE

Technical Problem

The present inventive concept is directed to providing a method of preparing an anion exchange membrane by substituting sulfonic acid groups ($-SO_3^-H^+$) in a perfluorinated sulfonic acid electrolyte membrane with various anion conductive functional groups through chemical modification and thus may solve the difficulty in membrane formation due to low solubility, which is the unique characteristic of an anion conductive ionomer, and a high resistance due to a large thickness.

The present inventive concept is also directed to providing an anion exchange membrane which has stabilized electron density due to the introduction of a bridge group according to chemical modification and is improved in ion conductivity and electrochemical performance

Technical Solution

To solve the above-described problems, the present inventive concept provides a method of preparing an anion exchange membrane characterized by substituting sulfonic acid groups in a perfluorinated sulfonic acid electrolyte membrane with ammonium groups, which are anion-conductive functional groups, the method comprising: a) chlorinating sulfonic acid groups in a perfluorinated sulfonic acid electrolyte membrane; b) nitrating the chlorinated electrolyte membrane; c) aminating the nitrated electrolyte membrane; and d) activating the anion-conductive functional groups by treating the aminated electrolyte membrane under alkaline conditions.

The present inventive concept also provides a method of preparing an anion exchange membrane, which are characterized by substituting sulfonic acid groups in a perfluorinated sulfonic acid electrolyte membrane with other anion-conductive functional groups, the method comprising: a) chlorinating sulfonic acid groups in a perfluorinated sulfonic acid electrolyte membrane; b) introducing bridge groups to the chlorinated electrolyte membrane; and c) substituting the chlorine groups in the bridge group-introduced electrolyte membrane with anion-conductive functional groups, wherein the anion-conductive functional groups are selected from phosphonium group, imidazolium group, pyridinium group or sulfonium group.

The present inventive concept also provides an anion exchange membrane in which sulfonic acid groups in a perfluorinated sulfonic acid electrolyte membrane are substituted with anion-conductive functional groups, wherein the anion-conductive functional groups are selected from ammonium group, phosphonium group, pyridinium group, imidazolium group and sulfonium group.

Advantageous Effects

Since an anion exchange membrane is prepared by chemically modifying sulfonic acid groups in a perfluorinated sulfonic acid electrolyte membrane according to the present inventive concept, it can solve the difficulty in membrane formation due to low solubility, which is a peculiar characteristic of anion conductive ionomers, and high resistance due to a large thickness.

Generally, since commercialized anion-exchange membranes having a hydrocarbon-based main chain does not have a hydrophilic-hydrophobic phase-separation structure, it exhibits low performance, but in the perfluorinated polymer electrolyte membrane used in the present inventive concept, the hydrophilic-hydrophobic phase separation structure is suitable for ion exchange, and thus it can exhibit high performance with a small thickness. However, fluorine of the ion-exchange membrane having a perfluorinated main chain has high electronegativity such that anion conductive groups applied to the terminal becomes chemically unstable, and in the present inventive concept, an electron density can be stabilized by introducing bridge groups in chemical modification. In addition, the anion exchange membrane prepared according to the present inventive concept has a small thickness, excellent stability, and high anionic conductivity and electrochemical performance, and thus it can be applied in a variety of industrial fields.

DESCRIPTION OF DRAWINGS

FIG. 3 shows the densities of membranes prepared according to examples and comparative examples of the present inventive concept.

FIGS. 4 and 5 are the table and graph showing the $OH^+$ ion conductivities of the anion exchange membranes prepared according to examples and comparative examples of the present inventive concept, respectively.

FIGS. 7 and 8 are the table and graph showing the area specific resistance of the anion exchange membranes prepared according to examples and comparative examples of the present inventive concept.

DETAILED DESCRIPTION

Figure 1:
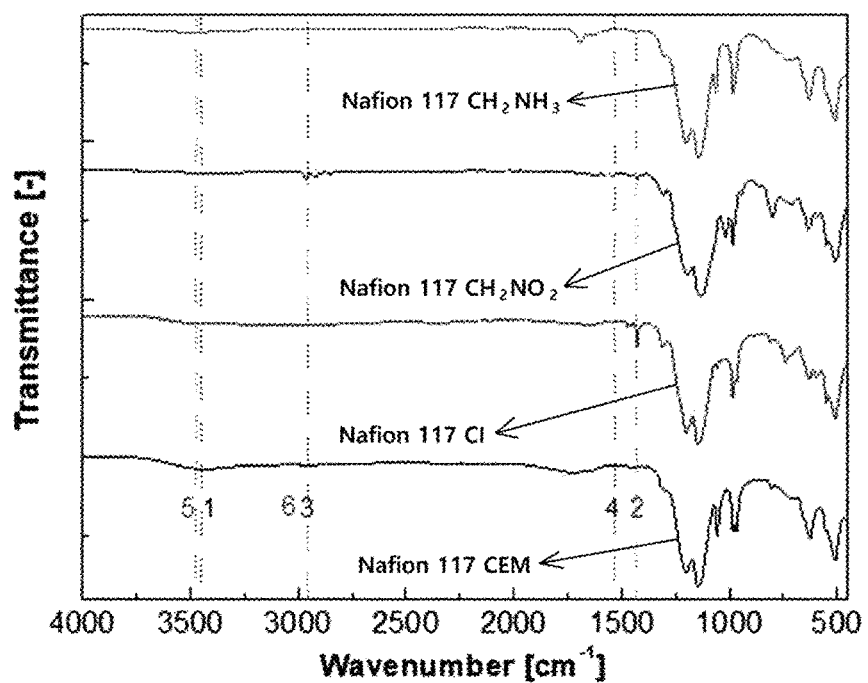
FIG. 1 is a Fourier transform infrared (FT-IR) analysis graph for confirming reaction steps of Example 1 of the present inventive concept.

The present inventive concept will be described in further detail with reference to examples and drawings as below.

A method of preparing an anion exchange membrane according to the present inventive concept is characterized substituting sulfonic acid groups in a perfluorinated sulfonic acid electrolyte membrane with ammonium groups, which are anion-conductive functional groups, the method comprising: a) chlorinating sulfonic acid groups in a perfluorinated sulfonic acid electrolyte membrane; b) nitrating the chlorinated electrolyte membrane; c) aminating the nitrated electrolyte membrane; and d) activating the anion-conductive functional groups by treating the aminated electrolyte membrane under alkaline conditions.

Another method of preparing an anion exchange membrane according to the present inventive concept is characterized by substituting sulfonic acid groups in a perfluorinated sulfonic acid electrolyte membrane with other anion-conductive functional groups, in which the anion conductive groups is selected from phosphonium group, imidazolium group, pyridinium group and sulfonium group. The method includes a) chlorinating sulfonic acid groups in a perfluorinated sulfonic acid electrolyte membrane, b) introducing bridge groups to the chlorinated electrolyte membrane, and c) substituting the chlorine groups in the bridge group-introduced electrolyte membrane with anion-conductive functional groups, The chemical modification of anion exchange membrane according to the present inventive concept is characterized by introducing various types of anion conductive groups by varying reaction pathways as shown in Reaction Schemes 1 to 5 below.

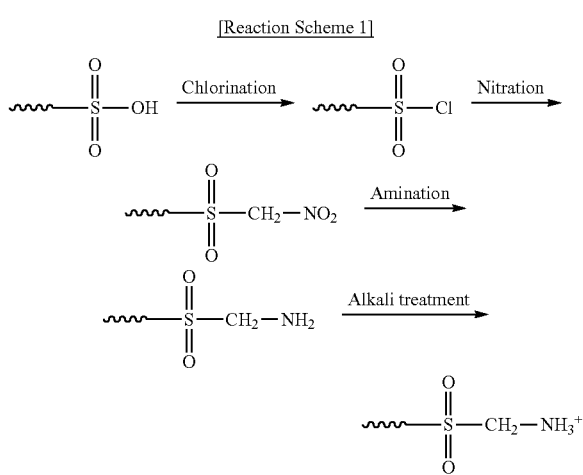

In the present inventive concept, modification may progress according to Reaction Scheme 1, and specifically, the chemical modification of an anion exchanger may be performed according to a first step (chlorination, —OH→—Cl), a second step (nitration, —Cl→—NO$_2$), a third step (amination, —NO$_2$→—NH$_2$), and a fourth step (alkaline treatment, —NH$_2$→—NH$_3{}^+$).

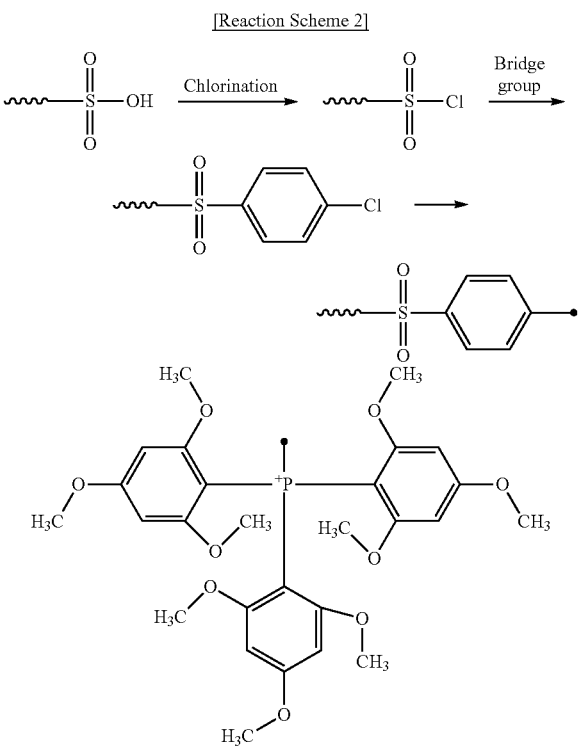

In addition, in the present inventive concept, modification may progress according to Reaction Scheme 2, and specifically, the chemical modification of an anion exchanger may be performed according to a first step (chlorination, —OH→—Cl), a second step (introduction of a bridge group, —Cl→—C$_6$H$_5$Cl), and a third step (substitution the chlorine group with phosphonium group, —Cl→—PR$_3^+$).

[Reaction Scheme 3]

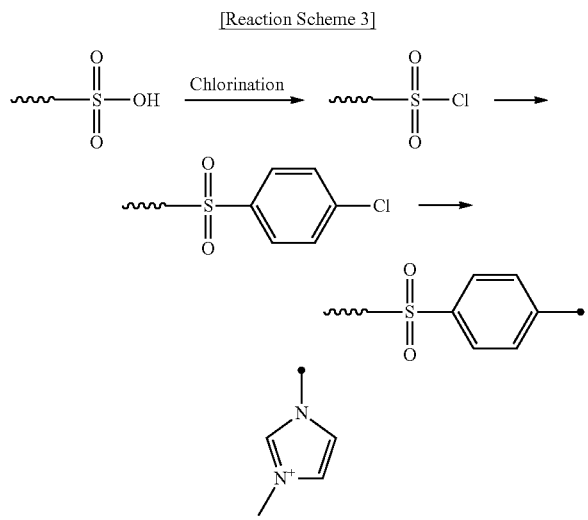

In addition, in the present inventive concept, modification may progress according to Reaction Scheme 3, and specifically, chemical modification of an anion exchanger may be performed according to a first step (chlorination, —OH→—Cl), a second step (introduction of a bridge group, —Cl→—C$_6$H$_5$Cl), and a third step (substitution the chlorine group with imidazolium group, —Cl→—C$_3$H$_3$N$_2^+$).

[Reaction Scheme 4]

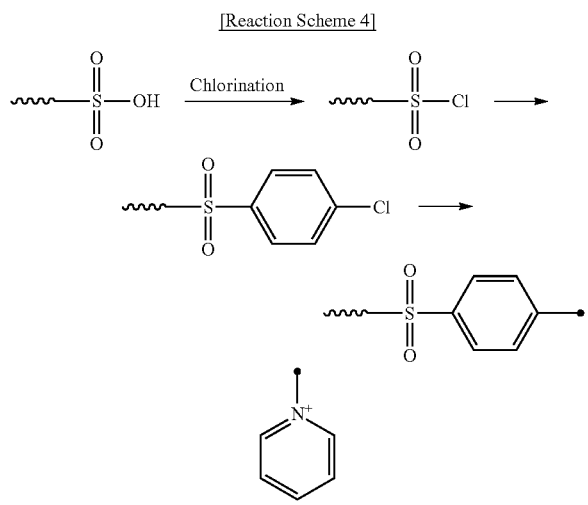

In addition, in the present inventive concept, modification may progress according to Reaction Scheme 4, and specifically, the chemical modification of an anion exchanger may be performed according to a first step (chlorination, —OH→—Cl), a second step (introduction of a bridge group, —Cl→—C$_6$H$_5$Cl), and a third step (substitution the chlorine group with pyridinium group, —Cl→—C$_5$H$_5$N$^+$).

[Reaction Scheme 5]

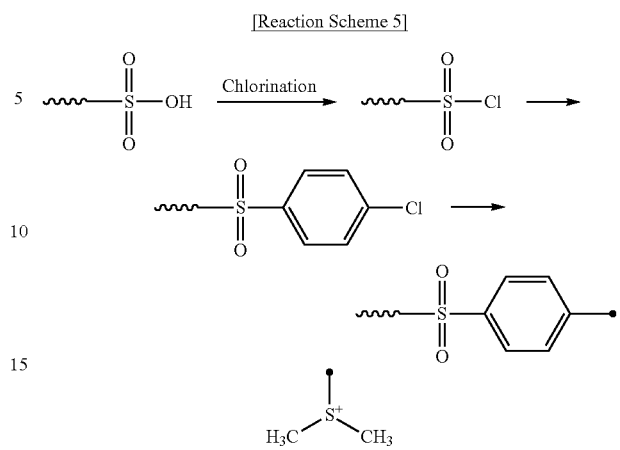

In addition, in the present inventive concept, modification may progress according to Reaction Scheme 5, and specifically, the chemical modification of an anion exchanger may be performed according to a first step (chlorination, —OH→—Cl), a second step (introduction of a bridge group, —Cl→—C$_6$H$_5$Cl), and a third step (substitution the chlorine group with sulfonium group, —Cl→—SR$_2^+$).

As a perfluorinated sulfonic acid electrolyte membrane that can be used in the present inventive concept, a perfluorinated sulfonic acid ionomer free-standing membrane or a reinforced composite membrane including porous supports may be used.

Specifically, as the perfluorinated sulfonic acid ionomer, for example, poly(perfluorosulfonic acid)s, sulfonic acid-containing copolymers composed of tetrafluoroethylene and fluorovinylether, and their mixtures thereof, may be used, but the present inventive concept is not limited thereto.

In addition, when a reinforced composite membrane are used as the perfluorinated sulfonic acid electrolyte membrane, porous supports included in the reinforced composite membrane may be, for example, polymers such as polytetrafluoroethylene, poly(vinyl difluoroethylene), polyethylene, polypropylene, poly(ethylene terephthalate), polyimide and polyamide, but the present inventive concept is not particularly limited thereto.

Specifically, the chemical modification according to the present inventive concept is described step by step as follows. First, the chlorination step may be performed by treating the perfluorinated sulfonic acid electrolyte membrane with a solution containing one or more compounds selected from the group consisting of SOCl$_2$, MeSO$_2$Cl, PCl$_5$, POCl$_3$, and dichloromethane (DCM), but the present inventive concept is not limited thereto. Any solution that can chlorinate sulfonic acid groups may be used.

In addition, chlorination is preferably performed at 10 to 110° C., and a reaction time may be selectively adjusted depending on how much the chemical modification of sulfonic acid groups is needed, and generally, it is preferable that the reaction time be in a range of approximately 30 seconds to 24 hours.

After the chlorination, reaction steps depend on the type of desired anion conductive groups. Among these reaction steps, the introduction of ammonium groups as anion conductive groups includes nitration, amination, and alkaline treatment after the chlorination according to Reaction Scheme 1.

Specifically, nitration may be performed by treating the perfluorinated electrolyte membrane undergoing chlorination with nitromethane or nitrobenzene solution, but the present inventive concept is not limited thereto. Any solution that can substitute —Cl with —$NO_2$ can be used. Here, the nitration is preferably performed in the presence of sodium carbonate ($Na_2CO_3$) catalyst. In addition, the nitration is preferably performed at 10 to 110° C., and a reaction time is suitably in a range of 30 seconds to 24 hours.

Next, the amination of the nitrated electrolyte membrane is performed. The amination may be performed by treating the nitrated electrolyte membrane, for example, with HCl aqueous solution, but the present inventive concept is not limited thereto. Any solution that can substitute —$NO_2$ with —$NH_2$ may be used. The amination is preferably performed at 10 to 110° C., and it is preferable that the reaction time be in a range of approximately 30 seconds to 12 hours.

Afterward, to activate an anion conductive group, alkaline treatment is performed. The alkaline treatment may be performed by treating the aminated electrolyte membrane with, for example, an aqueous solution containing one or more compounds selected from the group consisting of LiOH, NaOH and KOH, but the present inventive concept is not limited thereto. Any solution that can substitute —$NH_2$ with —$NH_3^+$ may be used. The alkaline treatment is preferably performed at 10 to 110° C., and a reaction time is preferably in a range of approximately 30 seconds to 24 hours.

In addition, the chemical modification of sulfonic acid groups with ammonium groups according to the present inventive concept may further include washing and drying after each of the chlorination, the nitration, the amination and the alkaline treatment.

Meanwhile, after the chlorination, the introduction of phosphonium group, imidazolium group, pyridinium group or sulfonium group as anion conductive groups includes the introduction of bridge groups and the substitution of chlorine groups with anion conductive groups after the chlorination according to Reaction Schemes 2 to 5. Generally, fluorine of ion-exchange membrane having a perfluorinated main chain has high electronegativity, and therefore, the anion conductive groups applied to the terminal may be chemically unstable. To this end, in the present inventive concept, as bridge groups are introduced in the chemical modification, an electron density may be stabilized.

Specifically, the introduction of bridge groups may be performed by treating the chlorinated electrolyte membrane with chlorobenzene or bromobenzene solution, and thereby phenyl group is introduced as the bridge group. In addition, the introduction of bridge groups may be performed at 10 to 130° C., and a reaction time is preferably in a range of 30 seconds to 24 hours.

Afterward, the substitution of chlorine groups with anion conductive groups may be performed by treating the bridge group-introduced electrolyte membrane with a solution including phosphonium group, imidazolium group, pyridinium group or sulfonium group. For example, the substitution may employ a solution including one or more compounds selected from tris(2,4,6-trimethoxyphenyl)-phosphine, 1-methylimidazole, pyridine, 4-dimethylamino pyridine, dimethyl sulfide and methyl phenyl sulfide, but the present inventive concept is not limited thereto. Any solution that can be substituted with desired anion conductive groups may be used. The reaction is preferably performed at 10 to 80° C., and it is preferable that the reaction time be in a range of approximately 30 seconds to 24 hours.

In addition, the chemical modification of sulfonic acid groups with phosphonium groups, imidazolium groups, pyridinium groups or sulfonium groups according to the present inventive concept may further include washing and drying after each of the chlorination, the introduction of bridge groups, and the substitution with anion conductive groups.

Meanwhile, in the chemical modification according to the present inventive concept, the reaction temperature and time ranges of each step may be appropriately adjusted as needed, but the present inventive concept is not particularly limited thereto. However, when each reaction is performed in temperature and time ranges lower than the above-mentioned temperature and time ranges, each groups may not be sufficiently converted, and thus the performance of the prepared anion exchange membranes may decrease, and when the reaction is performed in temperature and time ranges higher than the above-mentioned temperature and time ranges, the cost may increase due to the decrease in process efficiency according to a long-term reaction. For this reason, the reaction is preferably performed in each condition range.

Meanwhile, the anion exchange membrane according to the present inventive concept are an ion-exchange membrane in which sulfonic acid groups in a perfluorinated sulfonic acid electrolyte membrane are substituted with anion conductive groups, wherein the anion conductive groups are selected from ammonium group, phosphonium group, pyridinium group, imidazolium group and sulfonium group. In addition, anion conductive groups of the chemically-modified anion exchange membrane according to the present inventive concept are preferably bound with —$SO_2$ groups in the perfluorinated sulfonic acid electrolyte membrane via bridge groups selected from methyl group and phenyl group. Meanwhile, the $OH^-$ conductivity of the ion-exchange membrane substituted with anion conductive groups according to the present inventive concept is in a range of 0.001 to 0.3 S/cm, and the area specific resistance thereof is in a range of 0.0033 to 17.9 $\Omega cm^2$, and thus the anion exchange membrane exhibits very excellent performance and properties.

Hereinafter, the present inventive concept will be described in further detail with reference to specific examples. The following examples are provided to help in understanding the present inventive concept, but it should not be interpreted that the scope of the present inventive concept is limited thereto.

Example 1

Chlorination (the first step) in Reaction Scheme 1 was performed by stirring 5 g/mL of $SOCl_2$/dichloromethane at a speed of 400 rpm in a nitrogen atmosphere at 40° C. and reacting Nafion117 (membrane thickness: 175 μm), which is a perfluorinated sulfonic acid ionomer-based electrolyte membrane, for 4 hours. After the reaction, the resulting product was washed with dichloromethane for 5 minutes and dried in a vacuum oven at 80° C. for 4 hours.

Subsequently, nitration (the second step) was performed by stirring a nitromethane solution at a speed of 200 rpm in a nitrogen atmosphere at 80° C., adding sodium carbonate as a catalyst at 20 wt % with respect to the weight of the electrolyte membrane obtained after the first step, and reacting the chlorinated Nafion117 for 7 hours. Afterward, the resulting product was washed with deionized water for 3 hours and dried in a vacuum oven at 80° C. for 4 hours. Amination (the third step) was performed by stirring 0.5 M HCl solution at a speed of 200 rpm at 50° C., reacting the nitrated Nafion117 for 3 hours, washing the resulting product with deionized water for 3 hours, and drying the resulting product in a vacuum oven at 80° C. for 4 hours.

Finally, alkaline treatment (the fourth step) was performed by stirring 0.5 M KOH solution at a speed of 200 rpm at 50° C., reacting the aminated Nafion117 for 3 hours, washing the resulting product with deionized water for 3 hours, and drying the resulting product in a vacuum oven at 80° C. for 4 hours.

Example 2

Chlorination (the first step) in Reaction Scheme 2 was performed by stirring 5 g/mL of $SOCl_2$/dichloromethane at a speed of 400 rpm in a nitrogen atmosphere at 40° C. and reacting Nafion117, which is a perfluorinated sulfonic acid ionomer-based electrolyte membrane, for 4 hours. After the reaction, the resulting product was washed with dichloromethane for 5 minutes and dried in a vacuum oven at 80° C. for 4 hours.

Subsequently, the introduction of bridge groups (the second step) was performed by stirring chlorobenzene solution at a speed of 200 rpm in nitrogen atmosphere at 80° C. and reacting the chlorinated Nafion117 for 12 hours. Afterward, the resulting product was washed with deionized water for 3 hours and dried in a vacuum oven at 80° C. for 4 hours.

Finally, substitution the chlorine groups with phosphonium group (the third step) was performed by stirring a MeOH solution to which 30 wt % tris(2,4,6-trimethoxyphenyl)-phosphine (TTMPP) was added at a speed of 200 rpm in a nitrogen atmosphere at 30° C., reacting the phenyl chlorinated Nafion117 for 24 hours, washing the resulting product with deionized water for 3 hours, and treating the resulting product with 1 M KOH aqueous solution at a speed of 200 rpm at 50° C. to convert $Cl^-$ groups into $OH^-$ groups. Afterward, the resulting product was washed with deionized water for 3 hours and dried in a vacuum oven at 80° C. for 4 hours.

Example 3

An anion exchange membrane was prepared in the same manner as described in Example 2, except that the introduction of a bridge group (the second step) was performed by reacting Nafion117, which is the chlorinated electrolyte membrane prepared in the first step, at 10° C. for 24 hours, and the substitution the chlorine group with phosphonium group (the third step) was performed by reacting the resulting product at 10° C. for 36 hours.

Example 4

An anion exchange membrane was prepared in the same manner as described in Example 2, except that the introduction of a bridge group (the second step) was performed by reacting the Nafion117, which is the chlorinated electrolyte membrane prepared in the first step, at 130° C. for 30 seconds, and the substitution the chlorine group with phosphonium group (the third step) was performed by reacting the resulting product at 80° C. for 30 seconds.

Example 5

An anion exchange membrane was prepared in the same manner as described in Example 2, except that and substitution the chlorine group with imidazolium group (the third step) of Reaction Scheme 3 was performed by stirring 30 wt % 1-methylimidazole-added 1-propyl alcohol at a speed of 200 rpm in a nitrogen atmosphere at 30° C. and reacting Nafion117 undergoing the introduction of a bridge group (the second step) described in Example 2 for 24 hours, washing the resulting product with deionized water for 3 hours and treating the resulting product with 1 M KOH aqueous solution at a speed of 200 rpm at 50° C. for 3 hours to convert a $Cl^-$ group into a $OH^-$ group, and washing the resulting product with deionized water for 3 hours and drying the resulting product in a vacuum oven at 80° C. for 4 hours.

Example 6

An anion exchange membrane was prepared in the same manner as described in Example 3, except that the introduction of a bridge group (the second step) was performed by reacting the Nafion117, which is the chlorinated electrolyte membrane prepared in the first step, at 10° C. for 24 hours, and the substitution the chlorine group with imidazolium group (the third step) was performed by reacting the resulting product at 10° C. for 36 hours.

Example 7

An anion exchange membrane was prepared in the same manner as described in Example 3, except that the introduction of a bridge group (the second step) was performed by reacting the Nafion117, which is the chlorinated electrolyte membrane prepared in the first step, at 130° C. for 30 seconds, and the substitution the chlorine group with imidazolium group was performed by reacting the resulting product at 80° C. for 30 seconds.

Example 8

An anion exchange membrane was prepared in the same manner as described in Example 2, except that the substitution the chlorine group with pyridinium group (the third step) of Reaction Scheme 4 was performed by stirring a 30 wt % pyridine-added n-butyl alcohol solution at a speed of 200 rpm in a nitrogen atmosphere at 30° C. and reacting Nafion117 undergoing the introduction of a bridge group (the second step) in Example 2 for 24 hours, washing the resulting product with deionized water for 3 hours, treating the resulting product with 1 M KOH aqueous solution at a speed of 200 rpm at 50° C. to convert a $Cl^-$ group into an $OH^-$ group for 3 hours, and washing the resulting product with deionized water for 3 hours and drying the resulting result in a vacuum oven at 80° C. for 4 hours.

Example 9

An anion exchange membrane was prepared in the same manner as described in Example 8, except that the introduction of a bridge group (the second step) was performed by reacting Nafion117, which is the chlorinated electrolyte membrane prepared in the first step, at 10° C. for 24 hours, and the substitution the chlorine group with pyridinium group (the third step) was performed by reacting the resulting product at 10° C. for 36 hours.

Example 10

An anion exchange membrane was prepared in the same manner as described in Example 8, except that the introduction of a bridge group (the second step) was performed by reacting Nafion117, which is the chlorinated electrolyte membrane prepared in the first step, at 130° C. for 30 seconds, and the substitution the chlorine group with pyridinium group (the third step) was performed by reacting the resulting product at 80° C. for 30 seconds.

Example 11

An anion exchange membrane was prepared in the same manner as described in Example 2, except that a substitution the chlorine group with sulfonium group (the third step) of Reaction Scheme 5 was performed by stirring 30 wt % dimethyl sulfide-added MeOH at a speed of 200 rpm in a nitrogen atmosphere at 30° C. and reacting Nafion117 undergoing the introduction of a bridge group (the second step) in Example 2 for 24 hours, washing the resulting product with deionized water for 3 hours and treating the resulting product with 1 M KOH aqueous solution at a speed of 200 rpm for 3 hours at 50° C. to convert $Cl^-$ group into $OH^-$ group, and washing the resulting product with deionized water for 3 hours and drying the resulting product in a vacuum oven at 80° C. for 4 hours.

Example 12

An anion exchange membrane was prepared in the same manner as described in Example 11, except that the introduction of a bridge group (the second step) was performed by reacting Nafion117, which is the chlorinated electrolyte membrane prepared in the first step, at 10° C. for 24 hours, and the substitution the chlorine group with pyridinium group (the third step) was performed by reacting the resulting product at 10° C. for 36 hours.

Example 13

An anion exchange membrane was prepared in the same manner as described in Example 11, except that the introduction of a bridge group (the second step) was performed by reacting Nafion117, which is the chlorinated electrolyte membrane prepared in the first step, at 130° C. for 30 seconds and the substitution the chlorine group with pyridinium group (the third step) was performed by reacting the resulting product at 80° C. for 30 seconds.

Example 14

An anion exchange membrane was prepared in the same manner as described in Example 1, except that Nafion117-PFM, which is a reinforced composite membrane, was used as a perfluorinated sulfonic acid electrolyte membrane.

Example 15

An anion exchange membrane was prepared in the same manner as described in Example 2, except that Nafion117-PFM, which is a reinforced composite membrane, was used as a perfluorinated sulfonic acid electrolyte membrane.

Example 16

An anion exchange membrane was prepared in the same manner as described in Example 5, except that Nafion117-PFM, which is a reinforced composite membrane, was used as a perfluorinated sulfonic acid electrolyte membrane.

Example 17

An anion exchange membrane was prepared in the same manner as described in Example 8, except that Nafion117-PFM, which is a reinforced composite membrane, was used as a perfluorinated sulfonic acid electrolyte membrane.

Example 18

An anion exchange membrane was prepared in the same manner as described in Example 11, except that Nafion117-PFM, which is a reinforced composite membrane, was used as a perfluorinated sulfonic acid electrolyte membrane.

Example 19

An anion exchange membrane was prepared in the same manner as described in Example 1, except that, in the chlorination (the first step), Nafion117, which is a perfluorinated sulfonic acid ionomer-based electrolyte membrane, was stirred in a 1 g/mL of $SOCl_2$/dichloromethane solution at a speed of 800 rpm for 30 seconds.

Example 20

An anion exchange membrane was prepared in the same manner as described in Example 1, except that the chlorination (the first step) was performed by stirring 5 g/mL of $SOCl_2$/dichloromethane at a speed of 800 rpm at 10° C. and reacting Nafion117, which is a perfluorinated sulfonic acid ionomer-based electrolyte membrane, for 24 hours.

Example 21

An anion exchange membrane was prepared in the same manner as described in Example 1, except that the chlorination (the first step) was performed by stirring Nafion117, which is a perfluorinated sulfonic acid ionomer-based electrolyte membrane, in 1 g/mL of $MeSO_2Cl$/dichloromethane solution at a speed of 800 rpm for 2 hours in a nitrogen atmosphere at room temperature.

Example 22

An anion exchange membrane was prepared in the same manner as described in Example 1, except that the chlorination (the first step) was performed by stirring Nafion117, which is a perfluorinated sulfonic acid ionomer-based electrolyte membrane, in 5 g/mL of $MeSO_2Cl$/dichloromethane solution at a speed of 400 rpm for 12 hours in an air atmosphere at room temperature.

Example 23

An anion exchange membrane was prepared in the same manner as described in Example 1, except that the chlorination (the first step) was performed by stirring Nafion117, which is a perfluorinated sulfonic acid ionomer-based electrolyte membrane, in 0.5 g/mL of $PCl_5$/$POCl_3$ solution at a speed of 400 rpm for 12 hours at 80° C.

Example 24

An anion exchange membrane was prepared in the same manner as described in Example 1, except that the chlorination (the first step) was performed by stirring Nafion117, which is a perfluorinated sulfonic acid ionomer-based electrolyte membrane, in 5 g/mL of $PCl_5/POCl_3$ solution at a speed of 200 rpm for two hours at 110° C.

Example 25

An anion exchange membrane was prepared in the same manner as described in Example 1, except that the nitration (the second step) was performed by reacting Nafion117, which is the electrolyte membrane chlorinated (the first step) according to Example 1, for 30 seconds in a nitrogen atmosphere at 110° C.

Example 26

An anion exchange membrane was prepared in the same manner as described in Example 1, except that the nitration (the second step) was performed by reacting Nafion117, which is the electrolyte membrane chlorinated (the first step) according to Example 1, for 12 hours in a nitrogen atmosphere at 40° C.

Example 27

An anion exchange membrane was prepared in the same manner as described in Example 1, except that the nitration (the second step) was performed by reacting Nafion117, which is the electrolyte membrane chlorinated (the first step) according to Example 1, for 24 hours in a nitrogen atmosphere at 10° C.

Example 28

An anion exchange membrane was prepared in the same manner as described in Example 1, except that the nitration (the second step) was performed by stirring a 99.0% nitrobenzene solution at a speed of 200 rpm in a nitrogen atmosphere at 80° C. and reacting Nafion117, which is the electrolyte membrane chlorinated (the first step) according to Example 1, for 7 hours.

Example 29

An anion exchange membrane was prepared in the same manner as described in Example 1, except that the amination (the third step) was performed by reacting Nafion117, which is the electrolyte membrane nitrated (the second step) according to Example 1, for 30 seconds in a nitrogen atmosphere at 100° C.

Example 30

An anion exchange membrane was prepared in the same manner as described in Example 1, except that the amination (the third step) was performed by reacting Nafion117, which is the electrolyte membrane nitrated (the second step) according to Example 1, for 6 hours in a nitrogen atmosphere at 50° C.

Example 31

An anion exchange membrane was prepared in the same manner as described in Example 1, except that the amination (the third step) was performed by reacting Nafion117, which is the electrolyte membrane nitrated (the second step) according to Example 1, for 12 hours in a nitrogen atmosphere at 10° C.

Example 32

An anion exchange membrane was prepared in the same manner as described in Example 1, except that the alkaline treatment (the fourth step) was performed by reacting Nafion117, which is the electrolyte membrane aminated (the third step) according to Example 1, for 30 seconds in a nitrogen atmosphere at 110° C.

Example 33

An anion exchange membrane was prepared in the same manner as described in Example 1, except that the alkaline treatment (the fourth step) was performed by reacting Nafion117, which is the electrolyte membrane aminated (the third step) according to Example 1, for 6 hours in a nitrogen atmosphere at 80° C.

Example 34

An anion exchange membrane was prepared in the same manner as described in Example 1, except that the alkaline treatment (the fourth step) was performed by reacting Nafion117, which is the electrolyte membrane aminated (the third step) according to Example 1, for 12 hours in a nitrogen atmosphere at 10° C.

Example 35

An anion exchange membrane was prepared in the same manner as described in Example 1, except that the alkaline treatment (the fourth step) was performed by stirring 0.5 mol NaOH solution at a speed in a range of 200 to 1000 rpm in a nitrogen atmosphere at 50° C. and reacting Nafion117, which is the electrolyte membrane aminated (the third step) according to Example 1, for 3 hours.

Example 36

An anion exchange membrane was prepared in the same manner as described in Example 1, except that Nafion 211 was used as a perfluorinated sulfonic acid electrolyte membrane.

Example 37

An anion exchange membrane was prepared in the same manner as described in Example 1, except that Nafion 212 was used as a perfluorinated sulfonic acid electrolyte membrane.

Example 38

An anion exchange membrane was prepared in the same manner as described in Example 1, except that 3M 725 was used as a perfluorinated sulfonic acid electrolyte membrane.

Example 39

An anion exchange membrane was prepared in the same manner as described in Example 1, except that 3M 800 was used as a perfluorinated sulfonic acid electrolyte membrane.

Example 40

An anion exchange membrane was prepared in the same manner as described in Example 1, except that a reinforced composite membrane (3M 725-PFM) was used as a perfluorinated sulfonic acid electrolyte membrane.

Example 41

An anion exchange membrane was prepared in the same manner as described in Example 1, except that Aquivion 72S was used as a perfluorinated sulfonic acid electrolyte membrane.

Example 42

An anion exchange membrane was prepared in the same manner as described in Example 1, except that Aquivion 79S was used as a perfluorinated sulfonic acid electrolyte membrane.

Example 43

An anion exchange membrane was prepared in the same manner as described in Example 2, except that Nafion 211 was used as a perfluorinated sulfonic acid electrolyte membrane.

Example 44

An anion exchange membrane was prepared in the same manner as described in Example 2, except that Nafion 212 was used as a perfluorinated sulfonic acid electrolyte membrane.

Example 45

An anion exchange membrane was prepared in the same manner as described in Example 2, except that 3M 725 was used as a perfluorinated sulfonic acid electrolyte membrane.

Example 46

An anion exchange membrane was prepared in the same manner as described in Example 2, except that 3M 800 was used as a perfluorinated sulfonic acid electrolyte membrane.

Example 47

An anion exchange membrane was prepared in the same manner as described in Example 2, except that a reinforced composite membrane (3M 725-PFM) was used as a perfluorinated sulfonic acid electrolyte membrane.

Example 48

An anion exchange membrane was prepared in the same manner as described in Example 2, except that Aquivion 72S was used as a perfluorinated sulfonic acid electrolyte membrane.

Example 49

An anion exchange membrane was prepared in the same manner as described in Example 2, except that Aquivion 79S was used as a perfluorinated sulfonic acid electrolyte membrane.

Example 50

An anion exchange membrane was prepared in the same manner as described in Example 5, except that Nafion 211 was used as a perfluorinated sulfonic acid electrolyte membrane.

Example 51

An anion exchange membrane was prepared in the same manner as described in Example 5, except that Nafion 212 was used as a perfluorinated sulfonic acid electrolyte membrane.

Example 52

An anion exchange membrane was prepared in the same manner as described in Example 5, except that 3M 725 was used as a perfluorinated sulfonic acid electrolyte membrane.

Example 53

An anion exchange membrane was prepared in the same manner as described in Example 5, except that 3M 800 was used as a perfluorinated sulfonic acid electrolyte membrane.

Example 54

An anion exchange membrane was prepared in the same manner as described in Example 5, except that a reinforced composite membrane (3M 725-PFM) was used as a perfluorinated sulfonic acid electrolyte membrane.

Example 55

An anion exchange membrane was prepared in the same manner as described in Example 5, except that Aquivion 72S was used as a perfluorinated sulfonic acid electrolyte membrane.

Example 56

An anion exchange membrane was prepared in the same manner as described in Example 5, except that Aquivion 79S was used as a perfluorinated sulfonic acid electrolyte membrane.

Example 57

An anion exchange membrane was prepared in the same manner as described in Example 8, except that Nafion 211 was used as a perfluorinated sulfonic acid electrolyte membrane.

Example 58

An anion exchange membrane was prepared in the same manner as described in Example 8, except that Nafion 212 was used as a perfluorinated sulfonic acid electrolyte membrane.

Example 59

An anion exchange membrane was prepared in the same manner as described in Example 8, except that 3M 725 was used as a perfluorinated sulfonic acid electrolyte membrane.

Example 60

An anion exchange membrane was prepared in the same manner as described in Example 8, except that 3M 800 was used as a perfluorinated sulfonic acid electrolyte membrane.

Example 61

An anion exchange membrane was prepared in the same manner as described in Example 8, except that a reinforced composite membrane (3M 725-PFM) was used as a perfluorinated sulfonic acid electrolyte membrane.

Example 62

An anion exchange membrane was prepared in the same manner as described in Example 8, except that Aquivion 72S was used as a perfluorinated sulfonic acid electrolyte membrane.

Example 63

An anion exchange membrane was prepared in the same manner as described in Example 8, except that Aquivion 79S was used as a perfluorinated sulfonic acid electrolyte membrane.

Example 64

An anion exchange membrane was prepared in the same manner as described in Example 11, except that Nafion 211 was used as a perfluorinated sulfonic acid electrolyte membrane.

Example 65

An anion exchange membrane was prepared in the same manner as described in Example 11, except that Nafion 212 was used as a perfluorinated sulfonic acid electrolyte membrane.

Example 66

An anion exchange membrane was prepared in the same manner as described in Example 11, except that 3M 725 was used as a perfluorinated sulfonic acid electrolyte membrane.

Example 67

An anion exchange membrane was prepared in the same manner as described in Example 11, except that 3M 800 was used as a perfluorinated sulfonic acid electrolyte membrane.

Example 68

An anion exchange membrane was prepared in the same manner as described in Example 11, except that a reinforced composite membrane (3M 725-PFM) was used as a perfluorinated sulfonic acid electrolyte membrane.

Example 69

An anion exchange membrane was prepared in the same manner as described in Example 11, except that Aquivion 72S was used as a perfluorinated sulfonic acid electrolyte membrane.

Example 70

An anion exchange membrane was prepared in the same manner as described in Example 11, except that Aquivion 79S was used as a perfluorinated sulfonic acid electrolyte membrane.

Comparative Example 1

A 200-μm Neosepta-AHA reinforced electrolyte membrane consisting of a hydrocarbon commercially available from ASTOM was used.

Comparative Example 2

A 180-μm Neosepta-ACLE-5P reinforced electrolyte membrane consisting of hydrocarbon commercially available from ASTOM was used.

Comparative Example 3

A 150-μm Selemion-DSV reinforced electrolyte membrane consisting of hydrocarbon commercially available from AGC ENGINEERING was used.

Comparative Example 4

A 148-μm Selemion-ASV reinforced electrolyte membrane consisting of hydrocarbon commercially available from AGC ENGINEERING was used.

Experimental Example 1

Comparison of FT-IR Spectra

Through FT-IR analysis, chemical modification was confirmed. As shown in FIG. 1, in a step by step FT-IR spectra for preparing an anion exchange membrane using Nafion117 according to Example 1, after chlorination, the S—OH peak (1, 3418 cm$^{-1}$) disappeared and the S—Cl peak (2, 1421 cm$^{-1}$) was observed, and after nitration, the S—Cl peak disappeared and the N—O (4, 1575 cm$^{-1}$) and C—H (3, 2963 cm$^{-1}$) peaks were observed. Afterward, it can be confirmed that, after alkaline treatment was completed following the amination, the N—O peak disappeared, and the N—H (5, 3456 cm$^{-1}$) peak was observed.

Experimental Example 2

Measurement of Hydrophilicity

Figure 2:
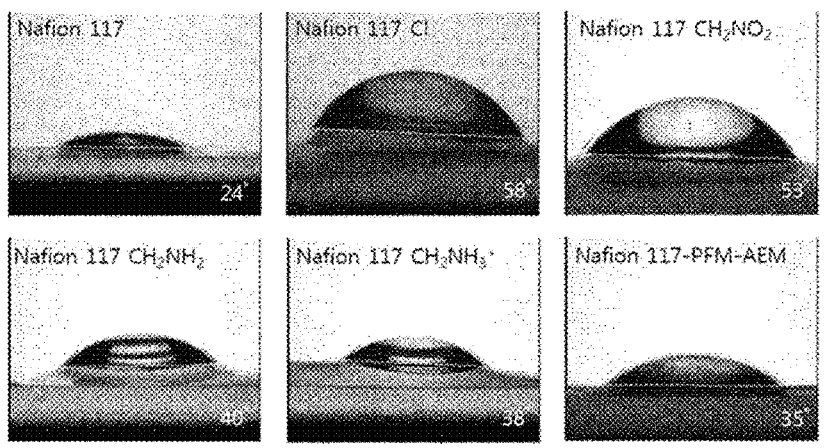
FIG. 2 is a set of images showing hydrophilicity measured by reaction step according to an example of the present inventive concept.

The change in chemical modification was examined by measuring hydrophilicity step by step in each example of the present inventive concept, and as shown in FIG. 2, hydrophobicity according to the chemical modification of a sulfonic acid group with high hydrophilicity was confirmed.

Experimental Example 3

Measurement of Density

The membranes prepared in the examples and the comparative examples were swollen in deionized water to equilibrium, and then densities were calculated according to Equation 1 below. The result is shown in FIG. 3.

$$\text{Density (g/cm}^3\text{)}=W/(l_1 \times l_2 \times T) \qquad \text{[Equation 1]}$$

[In Equation 1, W: the weight of membrane (g), $l_1$: the width of membrane (cm), $l_2$: the length of membrane (cm), T: the thickness of membrane (μm)]

Experimental Example 4

OH⁻ Conductivity

The OH⁻ ion conductivity of the anion exchange membrane prepared by the chemical modification described in each example was measured. The OH⁻ conductivity was calculated by Equation 2 below after measuring ohmic resistance or bulk resistance using a four point probe AC impedance spectroscopic method, and the result is shown in the table of FIG. 4 below.

$$\sigma = L/RS \quad \text{[Equation 2]}$$

[In Equation 2, σ: OH⁻ conductivity (S/cm), R: Ohmic resistance of polymer electrolyte (Ω), L: Distance between electrodes (cm), S: Area in electrolyte with constant current (cm²)]

Figure 5:
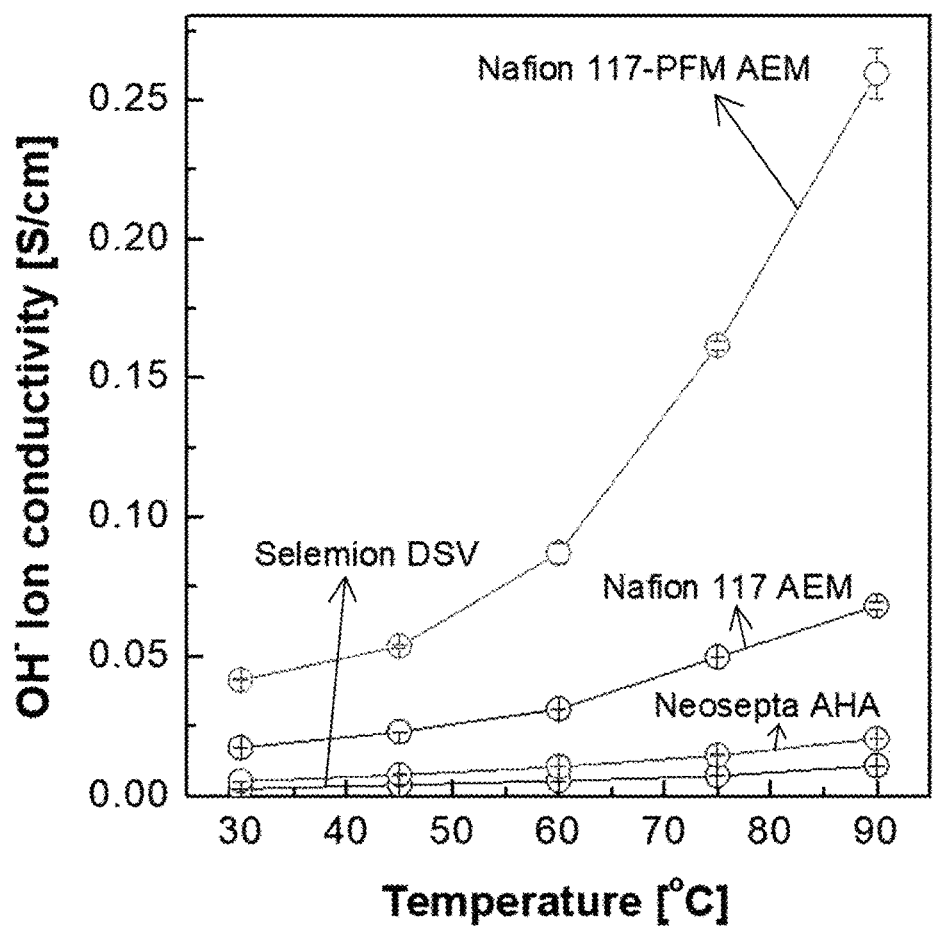
Figure 6:
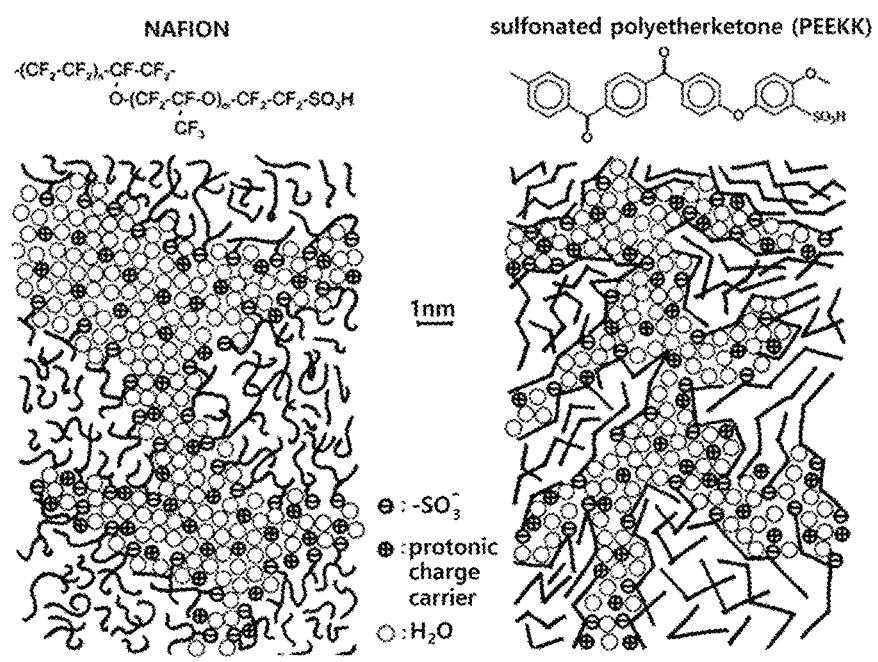
FIG. 6 is a diagram showing the hydrophilic-hydrophobic phase separation structure of a perfluorinated ionomer and a hydrocarbon-based ionomer.

As shown in FIG. 5, it can be confirmed that OH⁻ ion conductivities of Nafion117 AEM and Nafion117-PFM AEM, which are perfluorinated anion conductive polymer electrolyte membranes undergoing chemical modification according to examples of the present inventive concept, were significantly improved compared to commercially available hydrocarbon-based ionomer-based polymer electrolyte membranes described in the comparative examples. FIG. 6 is a diagram showing the hydrophilic-hydrophobic phase separation structure of a perfluorinated ionomer and a hydrocarbon-based ionomer. As confirmed in FIG. 6, a perfluorinated ionomer-based anion exchange membrane having an established hydrophilic-hydrophobic phase separation structure exhibits a higher performance than a hydrocarbon-based ionomer having an insufficient structure.

Experimental Example 5

Area Specific Resistance

The area specific resistance of the anion exchange membrane prepared by chemical modification described in an example was calculated by Equation 3 below with ion conductivity value, and the result is shown in the table of FIG. 7.

$$R(\Omega \text{cm}^2) = T/\sigma \quad \text{[Equation 3]}$$

[In Equation 3, σ: OH⁻ conductivity (S/cm), T: the thickness of ion-exchange membrane (cm)]

Figure 8:
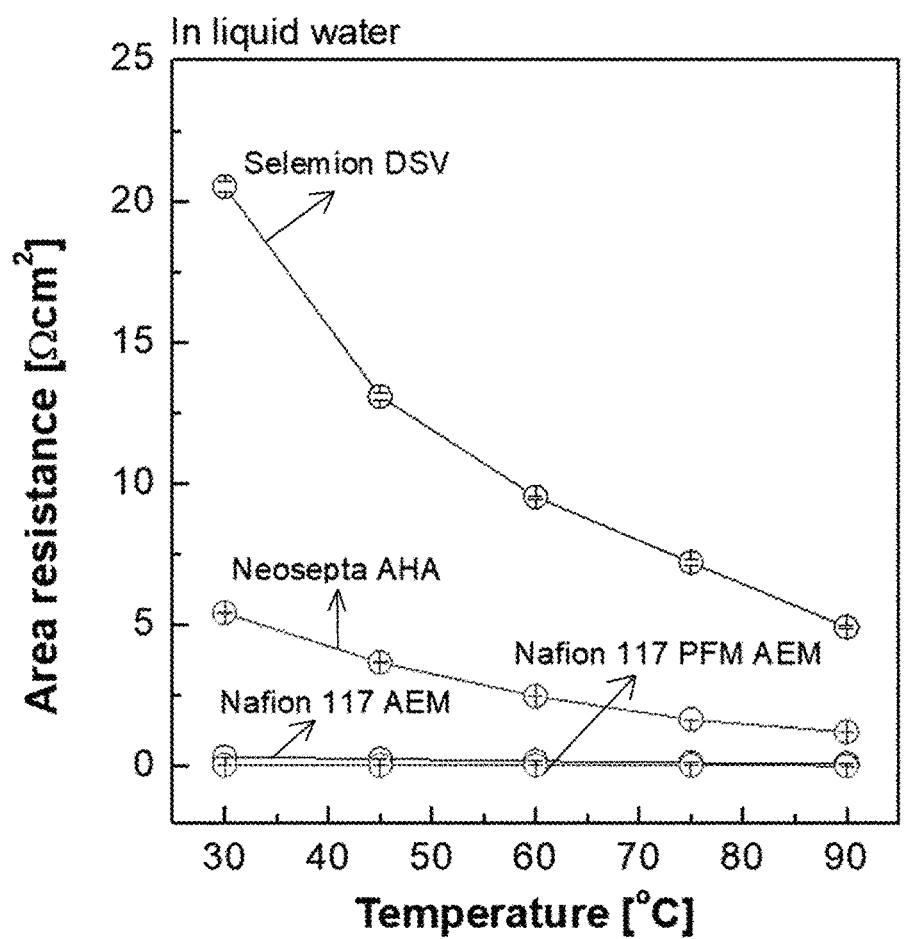

In addition, as shown in the graph of FIG. 8, it can be seen that the perfluorinated anion exchange membrane prepared according to an example of the present inventive concept exhibits significantly low area specific resistance and thus exhibits a higher electrochemical property than the hydrocarbon-based anion exchange membrane described in a comparative example.

The invention claimed is:

1. A method of preparing an anion exchange membrane comprising:
    a) chlorinating sulfonic acid groups in a perfluorinated sulfonic acid electrolyte membrane;
    b) nitrating the chlorinated electrolyte membrane;
    c) aminating the nitrated electrolyte membrane; and
    d) activating the anion-conductive functional groups by treating the aminated electrolyte membrane under alkaline conditions.

2. The method of claim 1, wherein the perfluorinated sulfonic acid electrolyte membrane is a perfluorinated sulfonic acid ionomer free-standing membrane or a reinforced composite membrane including porous supports.

3. The method of claim 2, wherein the perfluorinated sulfonic acid electrolyte membrane is the perfluorinated sulfonic acid ionomer free-standing membrane and wherein the perfluorinated sulfonic acid ionomer is selected from the group consisting of poly(perfluorosulfonic acid)s, sulfonic acid-containing-copolymers composed of tetrafluoroethylene and fluorovinylether, and their mixtures thereof.

4. The method of claim 2, wherein the perfluorinated sulfonic acid electrolyte membrane is the reinforced composite membrane including porous supports and wherein the porous supports of the reinforced composite membrane are selected from the group consisting of polytetrafluoroethylene, poly(vinyl difluoroethylene), polyethylene, polypropylene, poly(ethylene terephthalate), polyimide and polyamide.

5. The method of claim 1, wherein the chlorinating is performed by treating the perfluorinated sulfonic acid electrolyte membrane with a solution including one or more compounds selected from the group consisting of $SOCl_2$, $MeSO_2Cl$, $PCl_5$, $POCl_3$, and dichloromethane (DCM).

6. The method of claim 1, wherein the nitrating is performed by treatment with nitromethane or nitrobenzene solution.

7. The method of claim 1, wherein the nitrating is performed in the presence of sodium carbonate ($Na_2CO_3$) catalyst.

8. The method of claim 1, wherein the aminating is performed by treating the nitrated electrolyte membrane with an aqueous solution including HCl.

9. The method of claim 1, wherein treating the aminated electrolyte membrane under alkaline conditions is performed by treating the aminated electrolyte membrane with an aqueous solution including one or more compounds selected from the group consisting of LiOH, NaOH and KOH.

10. The method of claim 1, wherein each of the chlorinating, nitrating, aminating, and treating the aminated electrolyte membrane under alkaline conditions is performed at 10 to 110° C. for 30 seconds to 24 hours.

11. The method of claim 1, further comprising:
    washing and drying after each of the chlorinating, nitrating, aminating, and treating the aminated electrolyte membrane under alkaline conditions.

* * * * *